No. 681,294. Patented Aug. 27, 1901.
H. BLISS.
DISK CUTTING AND BORING MACHINE.
(Application filed July 14, 1900.)
(No Model.) 4 Sheets—Sheet 1.

Witnesses: Inventor:
C. H. Keeney Herbert Bliss
Anna V. Faust By Benedict & Morsell
Attorneys.

No. 681,294. Patented Aug. 27, 1901.
H. BLISS.
DISK CUTTING AND BORING MACHINE.
(Application filed July 14, 1900.)
(No Model.) 4 Sheets—Sheet 2.

Witnesses. Inventor.
Herbert Bliss
By Benedict & Morsell
Attorneys.

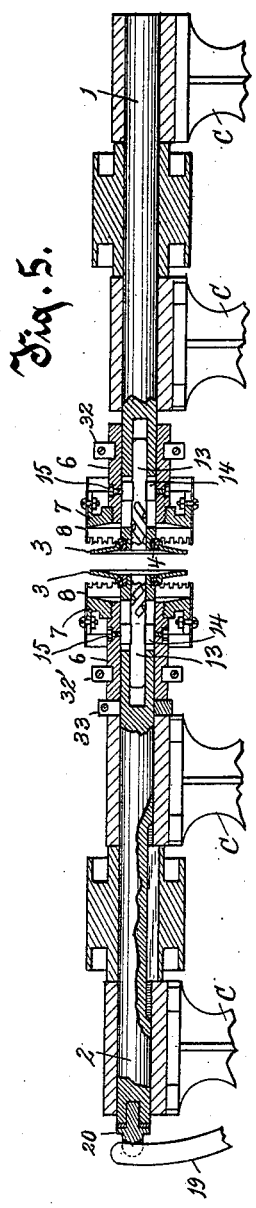

No. 681,294. Patented Aug. 27, 1901.
H. BLISS.
DISK CUTTING AND BORING MACHINE.
(Application filed July 14, 1900.)
(No Model.) 4 Sheets—Sheet 4.

Witnesses.
C. N. Keeney.
Anna V. Faust.

Inventor.
Herbert Bliss
By Benedict & Morsell
Attorneys.

UNITED STATES PATENT OFFICE.

HERBERT BLISS, OF SHEBOYGAN, WISCONSIN.

DISK CUTTING AND BORING MACHINE.

SPECIFICATION forming part of Letters Patent No. 681,294, dated August 27, 1901.

Application filed July 14, 1900. Serial No. 23,579. (No model.)

*To all whom it may concern:*

Be it known that I, HERBERT BLISS, of Sheboygan, in the county of Sheboygan and State of Wisconsin, have invented a new and useful Improvement in Disk Cutting and Boring Machines, of which the following is a description, reference being had to the accompanying drawings, which are a part of this specification.

The object of my invention is to provide an improved machine for cutting out disks from boards, laminated material, &c., especially heads or ends for barrels, tubs, spools, boxes, &c., and for boring such disks centrally when desired.

The invention consists of the machine and its parts and combinations of parts, as herein described and claimed, or the equivalents thereof.

Figure 1:
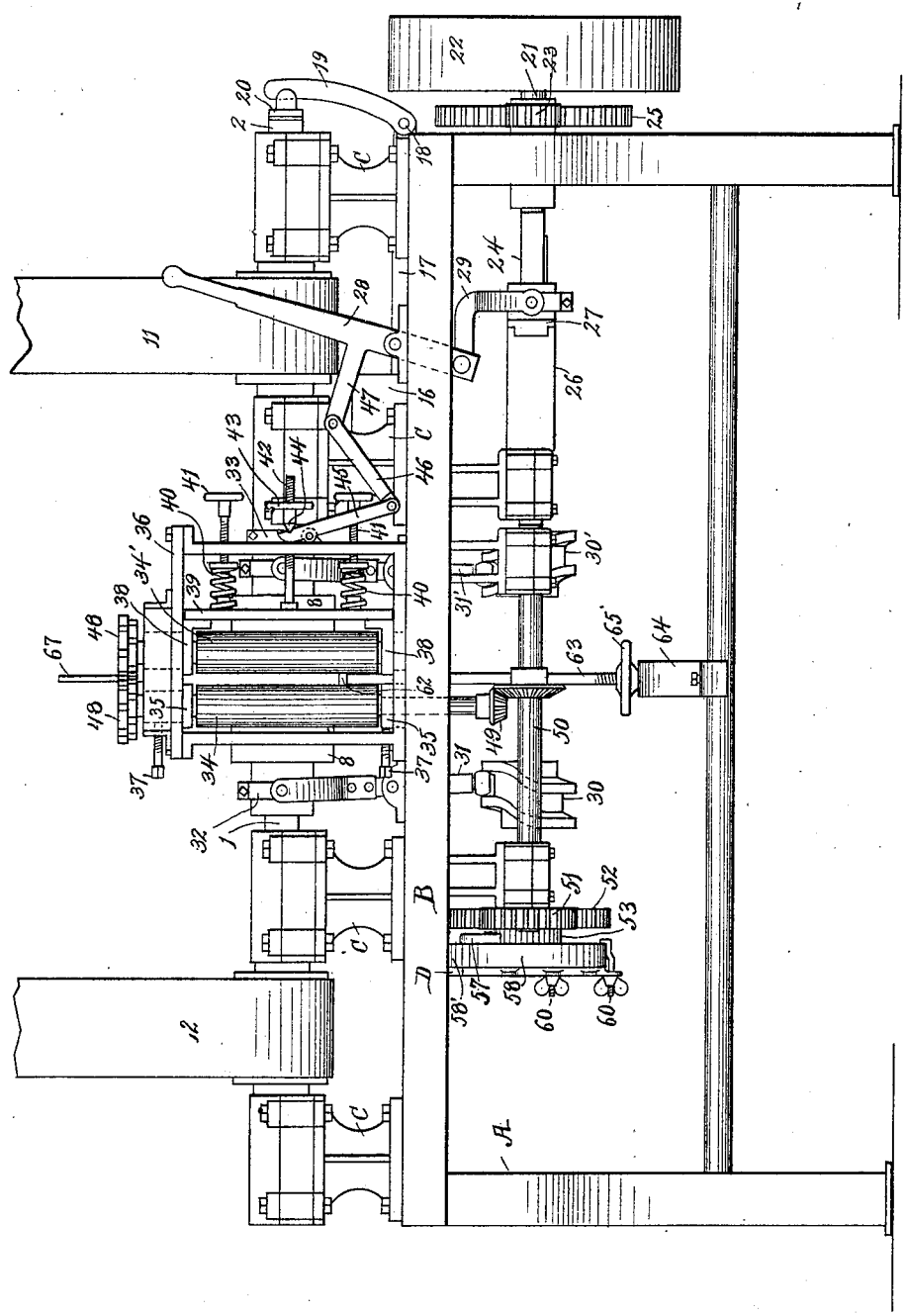
Figures 2, 12, 13:
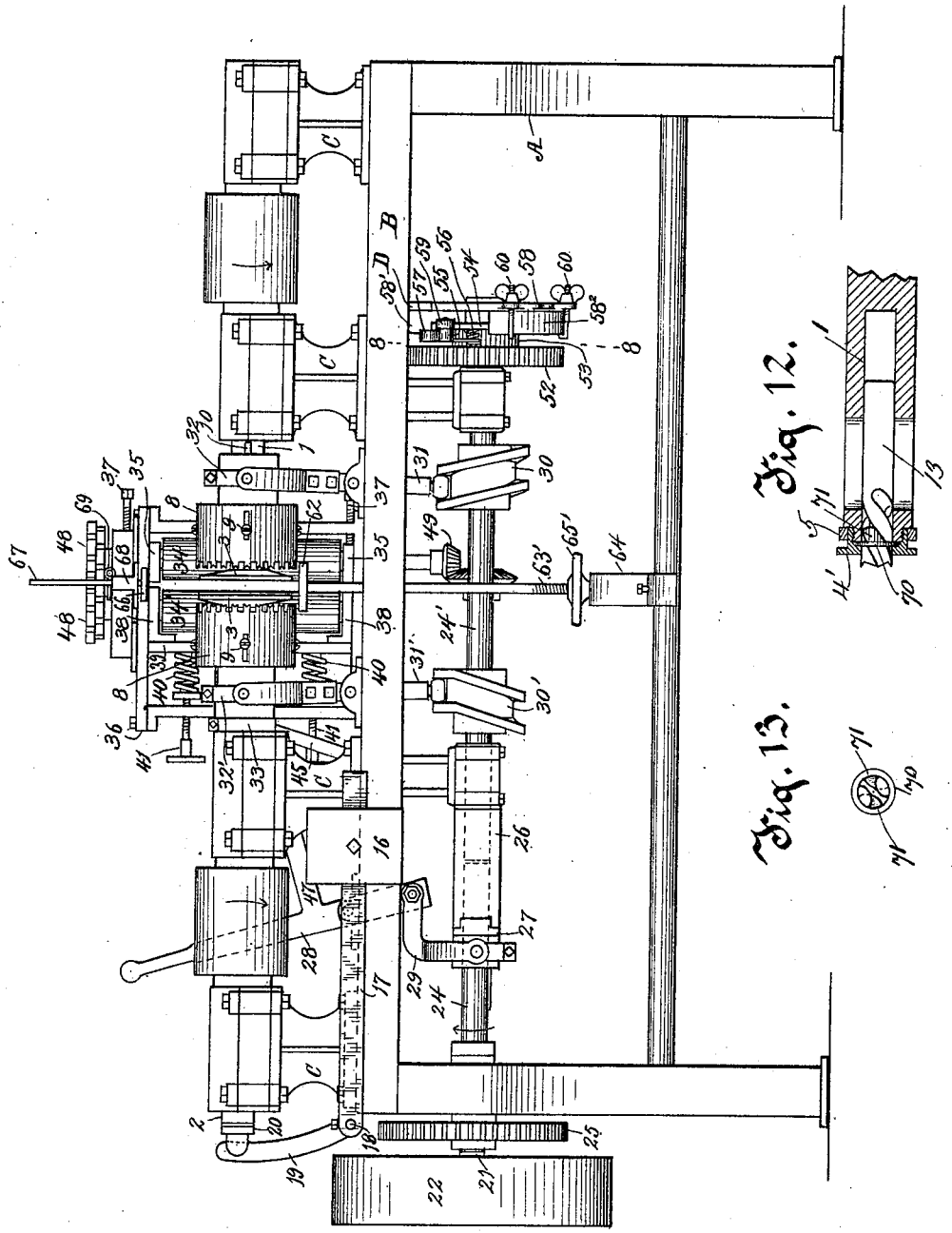
Figure 4:
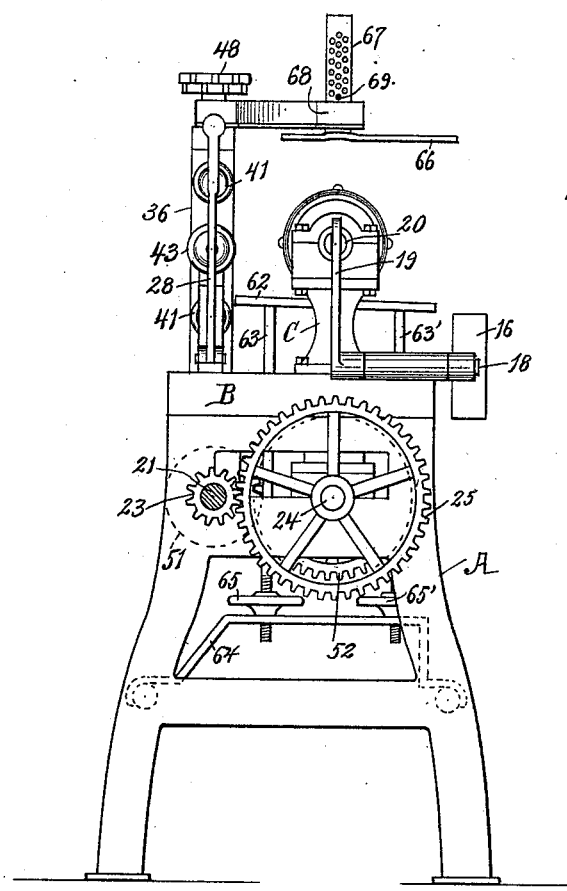
Figure 8:
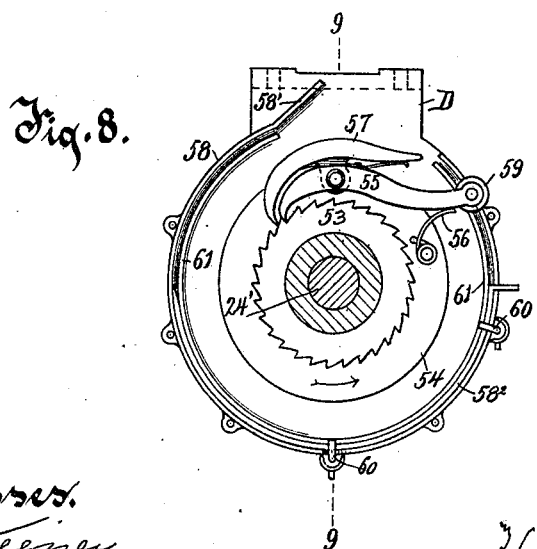
Figure 9:
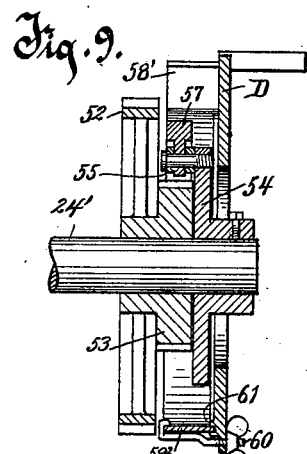

In the drawings, Figure 1 is an elevation of the improved machine at the front. Fig. 2 is an elevation of the same machine at the rear. Fig. 3 is a top plan view of the machine. Fig. 4 is an elevation of the machine at the end at the right in Fig. 1, the band-pulley being omitted and its arbor being shown in cross-section. Fig. 5 is a longitudinal section vertically of mechanism above the bed of the frame, the section being on a plane through the circular-cutting saws. Fig. 6 is a section through the circular-cutting saw and related parts, the members of the construction being shown in enlarged form and in other positions than those shown in Fig. 5 of the same parts. Fig. 7 is a transverse section of the construction on line 7 7 of Fig. 6. Fig. 8 is a transverse section on line 8 8 of Fig. 2 looking toward the right. Fig. 9 is a transverse section of the construction shown in Fig. 8, on line 9 9 thereof. Fig. 10 illustrates a bored disk as produced by this machine from laminated material, one layer of the material being broken away to exhibit the construction. Fig. 11 is a cross-section of a bored disk of laminated material. Figs. 12 and 13 show a modified form of construction.

In the drawings, A is a frame provided with a bed B, the frame, including the bed and other parts thereof, being of such form and size as adapts it for supporting the operative mechanism. For cutting out the disks produced by this machine complementary and oppositely-disposed circular crown-toothed saws are employed, and these saws are mounted on and driven by mechanism as follows: A revoluble shaft 1 is mounted non-movably endwise in boxes therefor on standards C C on the bed B. Another shaft 2, at a little distance from and in axial line with the shaft 1, is mounted reciprocable endwise in boxes therefor on other standards C C. Each of these shafts 1 and 2 is provided at its end with a flanged clamp 3, loose revolubly on the end of the shaft. The clamp 3 is preferably a circular and somewhat dishing member loose on a flanged collar 4, that turns by screw-thread on the contracted screw-threaded terminal portion of the shaft. A packing-ring 5 is placed about the collar behind the clamp 3 and between it and the annular shoulder formed at the end of the body portion of the shaft. These clamps 3 3 on the ends of the two shafts are located opposite each other and are adapted to receive between them the board or other material from which a disk is to be cut and clamp it in position while the saws rotate about the clamping members, which remain stationary. On each shaft 1 and 2 there is a sleeve 6, which, with an annular member 7, secured on the sleeve conveniently by screw-thread, forms a headstock on which the circular crown-toothed saw 8 is placed and to which it is secured adjustably endwise and removably by means of bolts 9, the bolts passing through slots therefor. The sleeves 6 are splined on the shafts by means of keys 10 and the headstocks comprising the sleeves 6. The annular member 7, with the circular saws 8 thereon, are reciprocable endwise on the shafts. The shafts 1 and 2 are driven from any convenient source of power and are preferably driven by means of belts 11 12, running from a power-shaft respectively on the shaft 1 and the shaft 2. These shafts are also provided severally with a boring device, conveniently in the form of a bit 13, inserted endwise in an axial socket therefor in the shaft and secured reciprocably, adjustably, and removably therein by locking-blocks 14 14, placed in longitudinal slots therefor in the shell of the shaft about the bit and held releasably against the bit by set-screws 15 15, turning through the sleeves 6 against the blocks. It will be understood that when these bits are employed for boring the material disks as they are being cut out by the saws the bit is so adjusted and secured in position that its cutting end is substantially in the plane of the circular saw and that the bit reciprocates on the shaft and rotates therewith concurrently with the saw.

The head-like clamp 3 on the shaft 1, which is non-movable endwise, is located in a predetermined and desirable plane, and the complementary clamp 3 on the shaft 2 is, by means of the reciprocable capability of the shaft 2, adapted to be held yieldingly at a near distance from the other clamp and to be withdrawn therefrom by means hereinafter described. For holding the clamp on the shaft 2 yieldinly to position adjacent to the complementary clamp a weight 16, Figs. 2 and 3, is employed, adjustable on a radial arm 17 on a pivot or rock-shaft 18, which is provided with another radial arm 19, the free end of which bears in a socket therefor against the head of a pin 20, loose in a socket therefor in the outer end of the shaft 2.

For shifting the head-stocks and the saws 8 toward and from each other, and incidentally for throwing back the clamp on the shaft 2 against the action of the weight 16, the following mechanism is provided: A short arbor 21 is journaled in the frame, which arbor is provided with a band-pulley 22 and a pinion 23. A shaft, Fig. 2, consisting of two members 24 24' is journaled in the frame, the member 24 being provided with a cog-wheel 25, that meshes with the pinion 23. The member 24' is provided with a terminal fixed sleeve 26, which projects therefrom and receives in the projection the revolubly loose member 24. A clutch-collar 27, splined on the member 24, is provided with teeth adapted to engage releasably crown-teeth on the sleeve 26. A hand-lever 28, pivoted medially on the frame, is connected at one extremity by a link 29 to the clutch-collar 27 and is adapted for shifting the clutch-collar into and out of engagement with the sleeve 26. The link 29 is furcate at one extremity, and straddles and is pivoted to the collar 27. The shaft member 24' is provided with collars 30 30', each having an annular groove therein, which groove through a portion of its annular course is in a plane at a right angle to the shaft and which through other portions of its course is at oblique angles to that plane, the groove being carried laterally in its annular course away from and back to that plane, the oblique directions of the courses of the grooves in the two collars being reversed. Also the collars are so mounted on the shaft that the respective straight and oblique courses are revolubly one a little in advance of the other. Shifting-levers 31 31', pivoted medially on the frame, ride at one extremity in the grooves in the collars 30 and 30' and at their other extremities are furcate and straddle and are pivoted to rings 32 32', loose in annular grooves therefor in the sleeves 6 6. The construction and disposition of the parts is such that as the shaft member 24' is rotated the saws 8 8 will be shifted toward and from each other, one saw being shifted a little in advance of the movement of the other saw, toward that other saw, to and slightly past the central line of the space normally between the saws, and will then be moved backward away from that advanced position, and the other saw will immediately afterward be moved to and slightly past the same central line of the space between the two saws and will then be withdrawn, both saws being held in their withdrawn or rearward positions briefly while the old material is being removed and new material is being inserted between them. A collar 33, secured tightly to the shaft 2 behind the sleeve 6, is engaged by the sleeve 6 as the head-stock is shifted rearwardly by the action of the collar 30', and the shaft 2, with the clamp 3 thereon, is also moved rearwardly against the resistance of the weight 16 sufficiently to release the clamp 3 from the material between the clamps 3 3. When the sleeve 6 on the shaft 2 is again moved forward by the action of the collar 30', the clamp 3 by the action of the weight 16 is moved forward and held against the material interposed between the clamps, while the saws are still further advanced for accomplishing their work as cutters. In the drawings, Figs. 2 and 5, the clamp on the shaft 2 is shown as withdrawn rearwardly to the limit of its movement, the movement of the clamp being at most only very limited indeed.

For feeding a board or similarly-formed material into the space between the clamps 3 3 a set of feed-rollers 34 34' is employed. These feed-rollers are disposed in upright position adjacent to, but at one side of, the clamps 3 3. The roller 34 is journaled in blocks 35 35, mounted slidably on the auxiliary frame 36. They are held adjustably toward the plane of the other roller by set-screws 37 37, turning in the frame 36 against the blocks. The roller 34' is also journaled in blocks 38 38, slidable on the frame 36. These blocks 38 38 are affixed to a bar 39, and springs 40 40 are interposed between this bar 39 and disks on the ends of adjusting-screws 41 41, turning through a member of the auxiliary frame 36. By this construction the roller 34' is held yieldingly up to its work. A rearwardly-extending rod 42, secured at one end to the bar 39, is screw-threaded near its other extremity, and a hand-nut 43, turning thereon, is adapted to adjust a knife-edged collar 44, loose on the rod 42, toward or from the bar 39. A lever 45, pivoted medially on the frame 36, is furcate at its free extremity and straddles the rod 42 and bears against the knife-edges of the collar 44. The other extremity of the lever 45 is connected by a link 46 to an arm 47 on the hand-lever 28. By means of the screws 41 the tension of the springs 40 can be regulated, and by the hand-nut 43 the position of the roller 34' can be adjusted with reference to the adjacent roller, while by means of the lever 45 and the hand-lever 28 the roller 34' can be withdrawn from the vicinity of the roller 34 sufficiently far to permit of the ready adjustment of a board or other material between the rollers.

The journals of the rollers 34 34' are provided with spur-toothed gears 48 48, whereby the motion of one roller is communicated to the other, causing them to rotate synchronously, but in reverse direction. The spur-teeth are preferably made in double sets and are sufficiently long to permit of the rollers being separated somewhat from each other and still be in gear one with the other. The roller 34 is provided with pinion 49 on its lower elongated journal, which meshes with a gear-wheel on a shaft 50, Fig. 1. This shaft 50 is mounted in the frame and is provided with a pinion 51, meshing with a cog-wheel 52, loose on shaft 24'. A ratchet-wheel 53 is integral and concentric with the wheel 52 on shaft 24'. A disk 54, tight on the shaft 24', is provided with a pawl 55, that engages releasably the ratchet-wheel 53. The pawl 55 is pivoted on the disk 54, and a spring 56, fixed on the disk, bears against the pawl and holds it yieldingly in engagement with the ratchet-wheel. Also for the purpose of preventing backlash or lost movement of the ratchet-wheel to the extent of half the length of a tooth thereon I preferably provide a secondary pawl 57, mounted concentrically with the pawl 55 and in such manner as to be released by the tilting of the pawl 55. This secondary pawl 57 is also held to its work by a spring and is adapted to catch a tooth on the ratchet-wheel that is not moved sufficiently far to be engaged by the pawl 55. The pawl 57 is in mechanical effect, and may be considered, a member of the pawl 55. As it is necessary that the feed-rollers 34 34' should rotate only at proper intervals to feed the material between the clamps 3 3 when the saws are not in action, I provide means for disconnecting the disk 54 on the shaft 24' actively from the ratchet-wheel 53. For this purpose a mutilated or incomplete circular rim 58 is fixed on the frame concentric with the disk 54 and in the path of an antifriction-roller 59, mounted on the free end of the pawl 55. The construction and disposition of the parts is such that when the roller 59 is in contact with the inner surface of the rim or travel-way 58 the pawl 55 is lifted out of engagement with the teeth of the ratchet-wheel 53, thereby permitting the shaft 24' to rotate freely without taking the ratchet-wheel 53 and the cog-wheel 52 therewith. The rim or travel-way 58 is provided with a short tangentially-disposed terminal portion 58', adapted to receive on the inner surface thereof the initial contact of the bearing-wheel 59 when the pawl 55 is being revolved with the disk 54 and by its inclination to carry the bearing-wheel on to the travel-way of the rim, thereby gradually lifting the pawl from engagement with a tooth on the ratchet-wheel. To provide for a greater or less feed of material between the clamps 3 3, so as to adapt the machine for producing larger or smaller disks, as desired, by the employment of larger or smaller saws 8 the rim 58 is advisably constructed of two members, one of which, $58^2$, is adjustable circumferentially on the frame-support, whereby the length of the rim circumferentially may be lessened or extended, as desired. This adjustable member $58^2$ of the rim is clamped to the frame member D, that supports the rim conveniently by means of bolts 60 60, the overturned heads of which engage the edge of the member $58^2$ and are secured to the frame member D by thumb-nuts thereon. A low continuation of the principal rim 58 on the outside and a low rib or flange 61 on the inside, affixed to the frame member D, form a groove adapted to receive the adjustable rim member $58^2$ therein and hold it in place on the frame member.

A support or runway for the material being fed into the machine consists of the straight flat member 62, mounted on the rod-like uprights 63 63', which near their lower extremities are screw-threaded and pass through a rigid strap 64, fixed on and forming a part of the frame, and these uprights are provided with adjusting-nuts 65 65', that rest on the strap 64. The runway 62 is preferably so adjusted as to be inclined slightly downwardly from the rollers 34 34' below the clamps 3 3. This permits the material to be fed through the rollers at an oblique angle downwardly, thereby causing the material to hug close to the runway 62 by the action of the rollers. A shield 66 above the saws is provided with a supporting member 67, that extends upwardly and movably through an arm 68, fixed on the frame. The member 67 is provided with a number of apertures, through one of which a pin 69 is inserted removably, which pin rests on the upper surface of the arm and supports the shield adjustably in place above the saws.

It will be understood that by releasing the set-screws 15 the bits 13 can be removed from the shaft or can be pushed farther into the sockets in the shafts, thereby withdrawing the bits from use. Also it will be understood that larger saws can be employed on this machine by unscrewing and thereby removing the members 7 and replacing them on the sleeves 6 with larger annular members or heads, on which correspondingly-larger saws can be secured. Neither is it my purpose that the machine herein described should be restricted to the employment of circular saws of the specific form shown in the drawings, as other saws or cutters of forms now in use for analogous purposes may be employed with my improved machine without departing from my invention. The disk E (shown in Figs. 10 and 11) illustrates a bored disk of laminated material produced by this machine.

In some kinds of material there is a liability that the chips cut by the bits 13 will stick in the pods or grooves of the bit and will be drawn into the shaft 1 and clog the bit, preventing free and proper movement of the bit out and in the shaft. To obviate this difficulty, I provide a bit-clearing device, (shown in Figs. 12 and 13,) which may be used when necessary. The bit-clearer consists of a disk 70, of steel, cut out centrally to fit loosely about the bit 13 and into the pods of the bit, the disk having guards 71 71 extending rearwardly therefrom and fitting loosely in the pods of the bit. This bit-clearer is held in place revolubly by bearing against the end of the shaft and being held thereto by a collar 4' of slightly-modified form. Fig. 13 is a view of the bit-clearer at its outer end.

What I claim as my invention is—

1. In combination, a shaft provided with a terminal axial socket, a bit adjustable endwise in the socket, clamping-blocks in elongated slots in the shell of the shaft, a sleeve on the shaft, and screws turning through the sleeve against the blocks forcing them against the bit.

2. In combination, a shaft provided with a terminal axial socket, a bit loose in the socket, a sleeve on the shaft, a crown-toothed cutting device on the sleeve, and means securing the bit to the sleeve holding the sleeve with its cutting device and the bit to coincident reciprocable movement on the shaft.

3. In combination, a rotatable shaft, a nonmovable clamping member rotatably loose on the end of the shaft, a bit reciprocable endwise in the end of the shaft and through the clamping member, a sleeve reciprocable endwise on the shaft, a crown-toothed cutting device fixed on the sleeve, and means securing the sleeve and the bit to each other and to revolution with the shaft and providing for concurrent reciprocation of the saw and the bit past the clamping member.

4. In combination, a rotatable shaft having an annular shoulder and a reduced terminal portion, a terminal flanged collar turning by screw-thread on the reduced portion of the shaft, a radiating clamping member loose on and about the collar between the flange of the collar and the shoulder of the shaft, and a packing-ring also on and about the collar and with the clamping member substantially filling the space between the flange of the collar and the shoulder on the shaft holding the clamping member to movement with the shaft endwise.

5. In combination a rotatable shaft a bit reciprocable in and rotatable with the shaft, and a bit-clearer fitted about the bit and entering the pod thereof and secured loosely to the shaft, adapted to clear the pod of the bit of chips.

6. The combination of a bit-holding member, a bit provided with spiral pods or grooves reciprocable endwise in the bit-holding member, and a bit-clearer secured loosely to the bit-holding member and entering the pod or pods, adapted as the bit is reciprocated to clear the bit of chips.

In testimony whereof I affix my signature in presence of two witnesses.

HERBERT BLISS.

Witnesses:
PETER JACOBS,
OTTO J. TRILLING.